Sept. 19, 1939.    S. K. TOWSON    2,173,616
CONTROL MECHANISM FOR INDUSTRIAL TRUCKS
Filed April 25, 1936    2 Sheets-Sheet 1
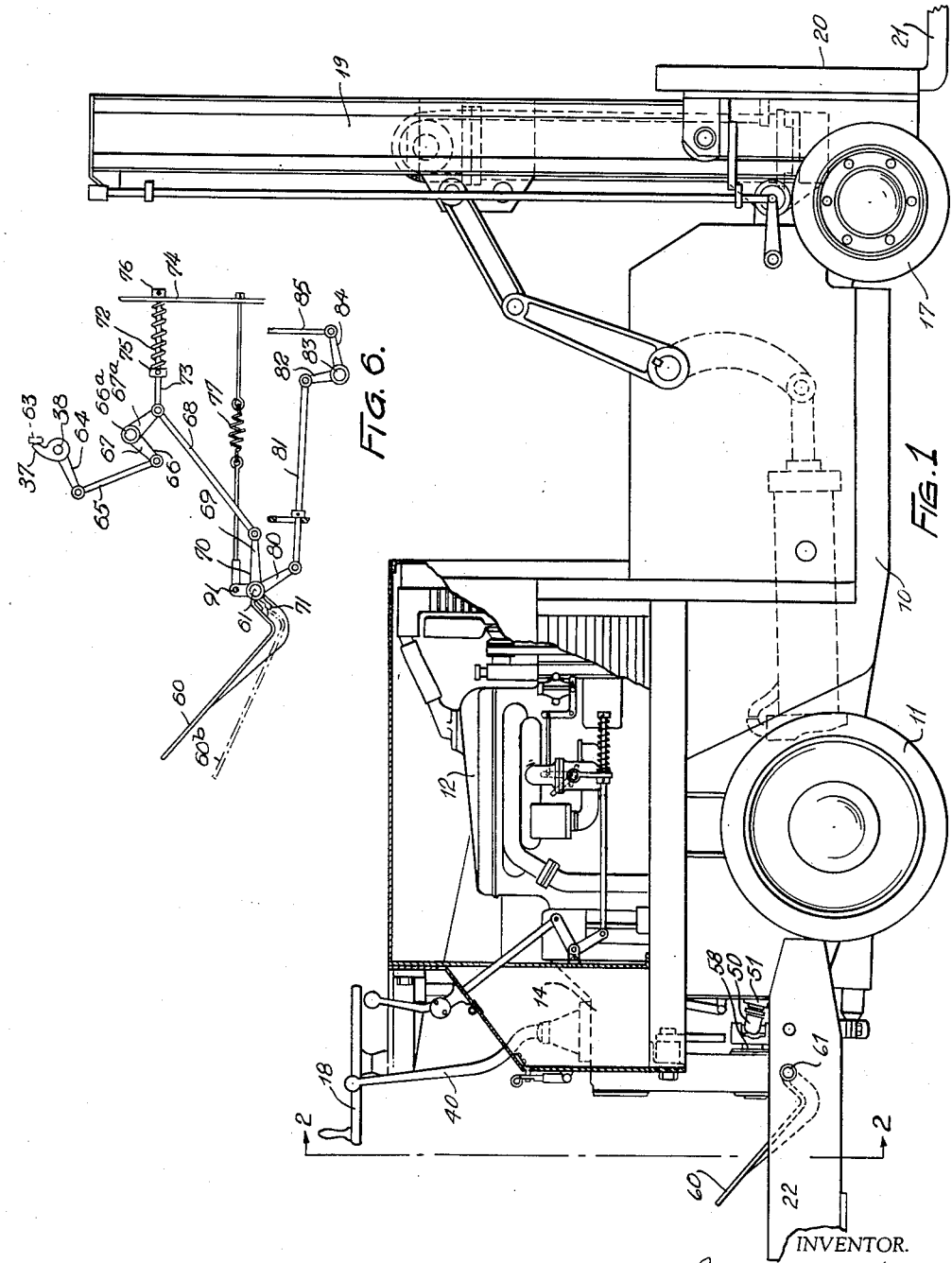
INVENTOR.
Sheldon K. Towson
BY
Bates, Golrick & Teare
ATTORNEYS.

Sept. 19, 1939.                S. K. TOWSON                2,173,616
                    CONTROL MECHANISM FOR INDUSTRIAL TRUCKS
                    Filed April 25, 1936            2 Sheets-Sheet 2
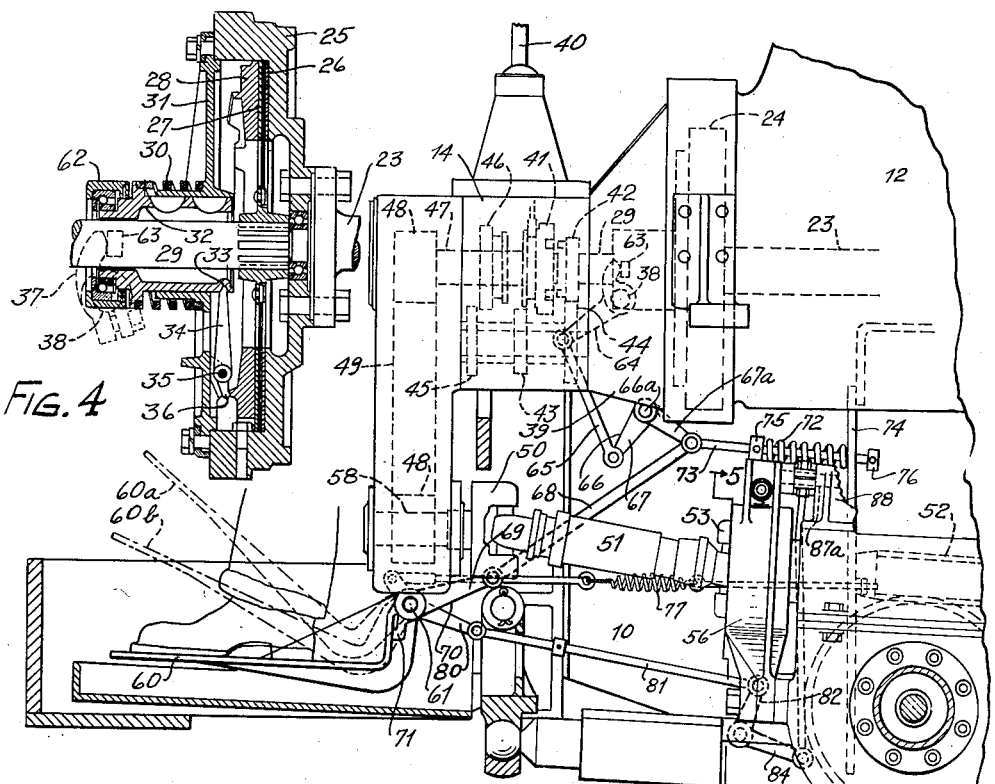
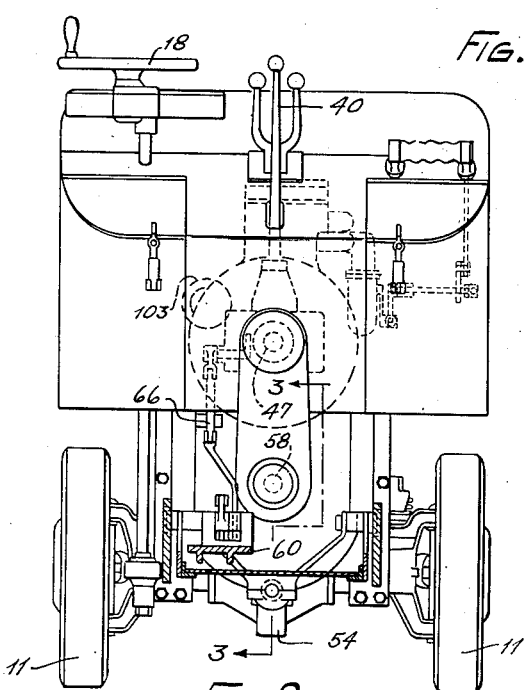
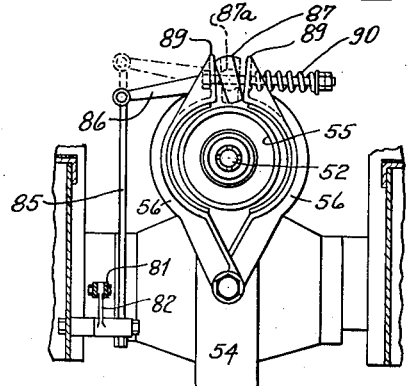
INVENTOR.
Sheldon K. Towson
BY
Bates, Gohrick & Terre
ATTORNEYS.

Patented Sept. 19, 1939

2,173,616

UNITED STATES PATENT OFFICE 2,173,616

CONTROL MECHANISM FOR INDUSTRIAL TRUCKS

Sheldon K. Towson, Cleveland Heights, Ohio, assignor to The Elwell-Parker Electric Company, Cleveland, Ohio, a corporation of Ohio Application April 25, 1936, Serial No. 76,373

2 Claims. (Cl. 192—13)

The present invention relates to a clutch and brake control mechanism for an industrial truck of the type propelled and operated by an internal combustion motor.

Industrial trucks for handling loads and transferring them from place to place in manufacturing establishments are comparatively well known at the present time. Such a truck generally comprises a relatively short frame, supporting, at its forward end, an electric power unit, namely, a storage battery unit and electric motors. At its rearward end the truck is generally provided with a low-slung rearwardly extending load-engaging member, such as a fork or platform, which is adapted to engage a load resting comparatively close to the truck supporting surface, raise the load, transport it to a new location, and there deposit the load adjacent the truck supporting surface.

While the industrial trucks in the past have been powered by electricity, at the present time there exists an increasing demand for industrial trucks powered by an internal combustion engine. The vast increase in automotive vehicles and the attendant familiarity of the average workman with the operations, as well as the familiarity of the average mechanic with the repair and maintenance of automotive vehicles, including the internal combustion power plants thereof, has greatly reduced the cost of operation, maintenance and repair of internal combustion engines in comparison with the cost of operation, maintenance and repair of electric power mechanisms. Likewise, the present high development of ventilation in industrial buildings permits the use of internal combustion engines in manufacturing plants, where heretofore such use was prohibitive, due to the dangerous fumes resulting from the operation of an internal combustion engine. Hence, in some instances internal combustion powered industrial trucks may be advantageously used.

Another advantage of the internal combustion engine for power for an industrial truck is the fact that it may be readily refueled, as contrasted with the refueling or resupplying storage batteries with power in electric operating units.

Attempts to provide an industrial truck powered by an internal combustion motor to meet the present demands, have presented many difficulties. Such trucks should not only be powered by an internal combustion motor, but also should have all of the advantages of the electric powered trucks resulting from years of experience and research. For instance, industrial trucks, powered by an internal combustion engine, if possible, should be as flexible in operation as electrically powered trucks. Likewise, the control members for such units should be accessible and maintained at a minimum number, so as to facilitate the operation of the truck.

One of the objects of the present invention is the provision of a clutch and brake control mechanism for industrial trucks utilizing an internal combustion engine as a source of power, which control mechanism will be comparatively simple to operate and wherein the number of control members will be maintained at a minimum and such members arranged to facilitate their use by the operator of the truck.

Other objects of the invention will become apparent from the following description, reference being had to the accompanying drawings by which I illustrate a preferred embodiment. The essential and novel features of the invention will be summarized in the claims.

In the drawings, Fig. 1 is a side elevation of an industrial truck embodying my invention, certain parts thereof being broken away to more clearly illustrate the internal construction thereof; Fig. 2 is a vertical section, the plane of the section being indicated by the lines 2—2 on Fig. 1; Fig. 3 is an enlarged detailed section, illustrating certain control mechanism, the plane of the section being taken substantially along the lines 3—3 of Fig. 2; Fig. 4 is a sectional detail of a clutch mechanism; Fig. 5 is a sectional view, as indicated by the lines 5—5 on Fig. 3, and illustrates the brake control mechanism; Fig. 6 is a diagram of the control mechanism of Fig. 3 in a different operating position.

Referring again to the drawings, the industrial truck in connection with which I have illustrated my improved control mechanism is shown, comprises a main frame 10, supported by a pair of dirigible driving wheels 11 and carrying an internal combustion motor 12. The motor is connected with the dirigible driving wheels 11 by a power transmission mechanism, generally indicated at 14, and a differential driving mechanism indicated at 15. The main frame is provided with a rearwardly extending low-slung frame member, the rearward end of which is supported by a pair of relatively small load-bearing wheels 17. These wheels are likewise preferably dirigibly arranged, both pairs of wheels being suitably connected to be controlled by a steering wheel 18.

At the rearward end of the truck is an upright guideway 19, on which a load-supporting carriage 20 is mounted for vertical movement. The load-supporting carriage may be provided with suitable rearwardly extending forks or a platform member 21, positioned relatively close to the truck-supporting surface, and arranged to be projected beneath a load, resting for instance, on spaced skid members, and lift the load clear of the truck-supporting surface to enable it to be transported from place to place. The forward end of the truck is provided with an operator's platform 22, and various control members, hereinafter more fully described, but including the steering wheel 18 above mentioned.

The motor 12, which is a source of motive power for the truck, is of the internal combustion type and may be of the kind generally found in automotive vehicles. The motor is supported by the main frame 10 with its crank shaft 23 extending longitudinally of the truck, as indicated in Fig. 3, and is connected to a clutch mechanism 24, which in turn is drivingly connected with the change speed transmission 14. As illustrated in Fig. 3, the crank shaft 23 of the motor is secured to a fly-wheel 25, one face of which is provided with a friction clutch surface 26, arranged to be engaged by a friction clutch surface 27 carried by a spider 28 which is splined to a clutch shaft 29, extending in axial alignment with the crank shaft.

The clutch members 26 and 27 are maintained in engagement with each other by a compression spring 30, interposed between a spider 31, carried by the fly-wheel 25, and a sleeve 32, which is splined to the spider and encircles the shaft 29. The sleeve is provided with a series of notches 33. Each notch engages a lever 34, which is pivoted as at 35, on the spider 31, and which bears as at 36 against the clutch spider 28. Consequent upon the movement of the sleeve 32, by a suitable rock arm 37 against the action of the spring 30, the levers 34 are rocked clockwise about their pivots, disengaging them from the spider 28, thereby releasing the pressure between the clutch surfaces 26 and 27. When, however, the rock arm 37 is moved in a counter-clockwise direction, the spring 30 draws the sleeve toward the left (Fig. 4), causing the levers 34 to reengage the clutch spider 28 and drivingly connect the clutch shaft 29 with the fly-wheel 25 and motor 12.

The power-transmission mechanism is generally indicated in Fig. 3, and may comprise the usual change-speed transmission unit, arranged to be selectively positioned by a suitable manually-operable shift lever 40 to cause the clutch shaft 29 to propel the truck at various speeds and in either a forward or reverse direction. Such mechanism being well known to the art, the transmission will not be described in detail. Suffice it to say that such mechanism includes a shiftable gear member 41, which may be moved into engagement either with a gear member 42, drivingly secured to the clutch shaft 29, or with a transmission gear 43. The gear 43 is provided with an integrally formed gear 44, which constantly meshes with the gear 42, thereby enabling two speeds to be obtained. Suitable reverse gears 45 are provided, which are selectively engaged by a shiftable gear member 46.

The shiftable gear members 41 and 46 are splined to a transmission shaft 47. The shaft 47 is connected by gearing 48 and a drive chain 49, with a counter-shaft 58, which in turn is connected by a universal coupling 50, with propeller shaft 51. The propeller shaft 51 is connected to a worm gear shaft generally indicated at 52 by a universal coupling 53. This worm gear drives the differential driving mechanism 15 to propel the vehicle in the usual manner. The driving connections between the motor and the driving wheels 11 above described have been described more in detail in my copending application, Serial No. 76,372, filed April 25, 1936, now Patent No. 2,114,156 hence reference to such application may be had for a more complete description of such mechanisms.

The truck is supplied with a brake mechanism to supplement the braking action of the worm driving mechanism of the rear axle differential unit 15. As shown in Figs. 3 and 5, a brake drum 55 is secured to the worm shaft 52 and pivotally mounted on the housing 54, which encloses the differential driving mechanism 15, is a pair of brake shoes 56, which are normally maintained in engagement with the brake drum 55, as will hereinafter become more apparent.

The brake and clutch mechanisms above described are controlled by a foot operated pedal member 60, which is pivotally mounted, as at 61, on the frame 10 and overhangs the operator's platform as indicated in Fig. 3. Normally this pedal is in the full line position of Figs. 1 and 6, or the dotted position 60a of Fig. 3, and is so arranged that consequent upon the depression of this pedal, by the operator, to the position indicated by the dotted lines 60b (Fig. 3) the brake mechanism is released. Further depression of the pedal to the position indicated in full lines (Fig. 3) moves the clutch rock arm 37 in a counter-clockwise direction and permits the clutch spring 30 to drivingly connect the clutch shaft 29 with the motor 12.

As illustrated in Figs. 3 and 4, a non-rotating clutch release collar 62, provided with an outwardly extending lug 63, is journalled on the clutch sleeve 32 and is arranged to be engaged by the clutch rock arm 37. This arm is secured to a shaft 38 carried by the clutch housing 39. Secured to the shaft 38 is a lever 64, which is connected by a link 65 with one arm 67 of a bell crank 66, pivoted as at 66a, to a shaft carried by the frame 10. The other arm 67a of this bell crank is connected by a link 68, with a rearwardly extending arm 69 of a bell crank 70 pivotally mounted on the pedal pivot 61. The other arm 71 of this bell crank is arranged to be engaged by the pedal 60 when it reaches the position indicated by the dotted lines 60b in Figs. 3 and 6.

As heretofore mentioned, the clutch spring 30 normally acts to maintain the clutch effective. However, a second spring 72 normally acts to maintain the clutch operating arm 37 swung in a counter-clockwise direction, causing it to act on the clutch sleeve and maintain the clutch surfaces 26 and 27 disengaged, thereby severing the driving connection between the motor and transmission unit. The spring 72 encircles a rod 73, one end of which is connected to the pivotal connection between the arm 67a of the bell crank 66 and the link 68. The other end of the rod 73 is slidably mounted in a frame member 74. The spring 72 is interposed between the frame member 74 and a collar 75 secured to the rod, and thus acts through the bell crank 66 and the link 65 to rock the clutch rock arm 37 in a clockwise direction (Figs. 3 and 6).

When the foot pedal 60 is in the full-line position, as shown in Fig. 3, the link 68 and the arm 69 of the bell crank 70 are substantially in alignment with each other. Hence, the pressure of the spring 72 on the operating pedal is very slight, while the pedal 60 is being maintained depressed by the operator of the truck during the transportation of the truck from place to place. Likewise, as the pedal rises from the full line position to the position indicated by the dotted lines 60b in Fig. 3, the pressure of the spring 72 on the foot pedal increases, due to the increase of the angle between the bell crank arm 69 and the link 68. Thus, the spring 72 may be of comparatively great strength to counteract the action of the clutch spring 30 and at the same time may be maintained compressed by the operator with little effort.

The action of the spring 72 is limited by a collar 76 which engages the frame member 74 when the pedal 60 has moved upward to the position indicated by the position 60b on Fig. 3, thus substantially relieving the pedal from any pressure due to such spring, whereby the operator may readily know that the clutch has been entirely disengaged. However, the clutch pedal will continue to move upward, unless stopped by the operator, under the influence of a comparatively light spring 77 which is interposed between the pedal and a suitable frame member, as will be hereinafter more fully described.

The foot pedal 60 also operates the braking mechanism. As shown in Figs. 3, 5 and 6, the foot pedal is arranged to operate an arm 80, which is connected by a link 81 with one arm 82 of the bell crank pivoted as at 83 to the truck frame. The other arm 84 of this bell crank is pivotally connected by a link 85 with a lever 86, which is securely clamped to a cam shaft 87a, rotatably mounted in a bearing bracket 88 integral with differential housing 54. Secured to the cam shaft 87a is a cam 87, which is interposed between ears 89 of the brake shoes 56. The shoes 56 are normally maintained in engagement with the drum by a spring 90.

Consequent upon the depression of the brake pedal from the position indicated in Fig. 3 by the dotted line position 60a to the dotted line position 60b, the lever 86 will be rocked clockwise, thereby causing the cam to engage the brake shoes and move them out of contact with the brake drum 55, thereby releasing the brake. Continued movement of the pedal member from the dotted line position 60b to the full line position 60 has substantially no effect upon the braking mechanism, due to arcuate surfaces of the cam 87. When, however, the pedal is released, the spring 77, which is connected to an arm 91 of the pedal lever 80, returns the brake linkage to its normal position (Fig. 6) and permits the brake spring 90 to draw the brake shoes 56 into engagement with the drum 55, thereby applying the brake whenever the pedal is released.

The lever 80 and the link 81 are so arranged that when the pedal 60 is in its lowermost position, the brake spring will have little or no effect upon the pedal. As illustrated in Fig. 3, the lever and link have been moved into substantial alignment with each other. The pressure of the brake spring 90 therefore does not materially affect the pedal 60. Hence the pedal is readily maintained depressed by the operator during the operation of the truck.

I claim:

1. A control mechanism for an industrial truck, having a wheel propelled frame, an operator's platform mounted at the forward end of the frame and an internal combustion motor operably connected to said wheels, such control mechanism including a pivoted pedal, a clutch interposed between the motor and the wheels, a brake mechanism interposed between the clutch and the wheels, resilient means to normally maintain the clutch inactive, means whereby said resilient means is counteracted by the operation of the pedal member, said last-named means including a pivoted arm actuated by said pedal and a link pivotally connected between the arm and said resilient means, and so arranged that consequent upon the rocking of the pedal member, the arm will be moved to a position substantially in alignment with the link and thereby cause the resilient means to react on the pivot of said arm.

2. A control mechanism for an industrial truck having a wheel propelled frame, together with an operator's platform mounted at the forward end thereof, and an internal combustion motor operably connected to said wheels, such control mechanism comprising a pivoted pedal member, a clutch interposed between the motor and the wheels, a brake mechanism interposed between the clutch and the wheels, resilient means to normally maintain the clutch inactive, a second resilient means to normally cause the brake to become active and means whereby both of said resilient means are counteracted by the operation of the pedal member, said last-named means including a pair of pivoted levers actuated by said pedal and a pair of links pivotally connected between the levers and the brake and clutch mechanisms respectively, and wherein said levers and links are adapted and arranged so that consequent upon the rocking of the pedal member the respective levers will be moved into substantial alignment with their respective links, thereby relieving the pedal member of the pressure of said resilient means when the pedal is maintained in operation.

SHELDON K. TOWSON.